April 17, 1928.
D. J. McCARTHY
1,666,102
SIGNAL LIGHT SUPPORTING STRUCTURE
Filed Sept. 30, 1926
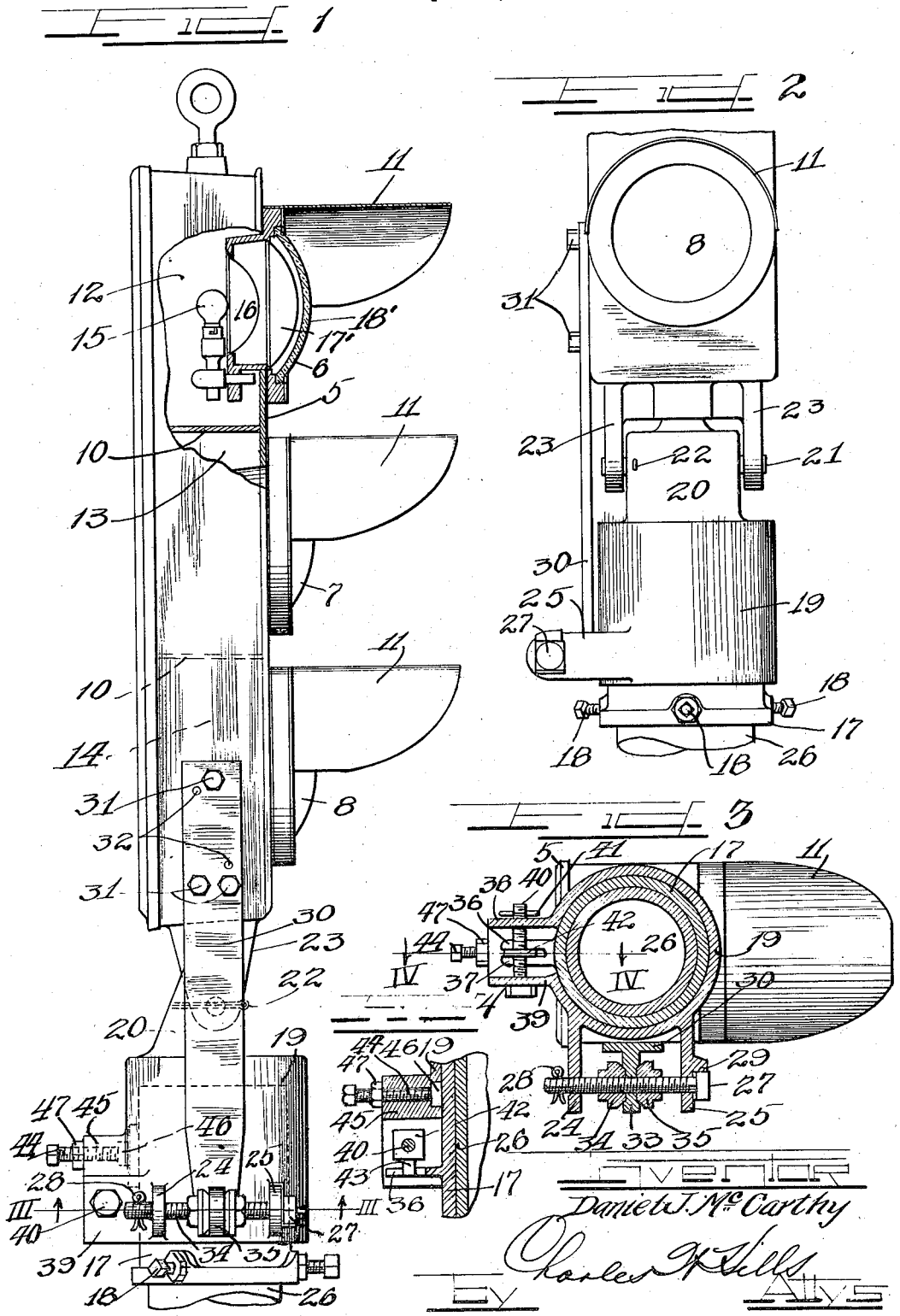

Patented Apr. 17, 1928.

1,666,102

UNITED STATES PATENT OFFICE.

DANIEL J. McCARTHY, OF ELGIN, ILLINOIS, ASSIGNOR TO CHICAGO RAILWAY SIGNAL & SUPPLY COMPANY, OF CARPENTERSVILLE, ILLINOIS, A CORPORATION OF ILLINOIS.

SIGNAL-LIGHT-SUPPORTING STRUCTURE.

Application filed September 30, 1926. Serial No. 138,587.

The invention relates to improvements in means for supporting signal lights and especially the casing containing three indication light signal devices, such as are commonly used along the rights of way of railroads for indicating danger, caution and safety.

One of the objects is to provide improved means for supporting three indication signal devices.

Another object is the provision of micrometric means for circumferentially adjusting the beams of light to illuminate an objective field desirable for the purpose and other means for adjusting the device and the lights thereon to vary the angular relation of the beam of light with respect to a horizontal plane.

A further object is to provide a staunch support for a three-light indication device and accurate means to adjust said casing, with respect to the support, in extremely small increments and decrements of movement, and firm reliable means for holding the parts in adjusted positions.

Other objects, benefits and refinements will become apparent to persons skilled in the art, from a consideration of the following description and the accompanying drawings forming a part hereof, wherein:

On the drawings:

Figure 1 is a side elevation of the device as it appears mounted on a pipe or staff.

Figure 2 is a front elevation of a lower fragment of the casing device and the top of the support.

Figure 3 is a transverse section taken on line III—III of Figure 1.

Figure 4 is a section taken on line IV—IV of Figure 3.

In all the views the same reference characters indicate similar parts.

The three indication units are contained in the casing 5, which is mounted on a tubular support or staff 26. This unit containing casing cannot be rigidly secured to the supporting staff for the reason that the projected rays or beam of light must proceed along a very definite path with respect to the railroad track and the perpendicularity of the staff must be and remain true and unchangeable. It would be a difficult operation to so set the staff that it would not be subject to changes in position or to primarily place it in position to accurately accommodate the light unit to its requirements.

For this reason the light unit must be made adjustable with regard to its more rigid support, and this adjustment must be made in extremely small gradations with respect to its rigid support, so that location of the field of illumination may be varied circumferentially with respect to the vertical axes of the unit about which it is moved and circumferentially about a horizontal axis upon which the unit may be moved. And finally there must be employed a very rigid and reliable locking means to infallibly hold the unit in adjusted position. The three-indication unit casing 5 accommodates three separated independently operable signal light indicating units 6, 7 and 8 arranged in vertical sequence and each light signal is capable of projecting a characteristically colored light beam, for example, green, yellow and red, respectively. The casing is divided into three separate light proof compartments or chambers by partitions 10 so that the light from one indication unit will not interfere with the operation of an adjacent unit. Each unit is partly enclosed by a forwardly projecting hood or cowl 11 that protects the unit lens from the effect of light emanating from the headlight of an approaching locomotive or from the rays of the sun. Either of which may impinge on the lens and produce a false signal if the lens were not properly shielded by the cowl. These extraneous influences may also serve to extinguish a signal or to render it indistinct by a blurring effect.

The light units 6, 7 and 8 within the chambers 12, 13 and 14 respectively of the casing, may be of any acceptable character, each having a lamp 15 and one or more lenses 16—16', and when desired, a roundel 18 of suitably colored glass.

The supporting post or staff 26 may well be a pipe, or other circular support, properly set in the ground for permanent duration. Overlying the top end of the pipe, a sleeve 17 is rotatable thereon and may be fixed thereto by the set screws 18. Another sleeve 19 is rotatable on the sleeve 17. Its upper end is closed and projecting upwardly therefrom is a lug 20 upon which the threechambered casing 5 is pivoted and upon which it may be inclined. A stud shaft or pintle 21 passes through the lug 20 and projects therebeyond at each end. It is fixed and held in place by the cotter pin 22.

A pair of parallel arms or ears 23 depend from the lower end of the casing 5, and are spaced to enclose the lug 20 and are pivotally mounted on the extending ends of the pintle 21. The casing 5 may be inclined, more or less on its pivoted support.

The means for adjusting the extent of inclination of the casing 5 in micrometric gradation will now be described. Two parallel spaced arms 24 and 25 project laterally from and are parts of the outer sleeve 19. A screw bolt 27 passes loosely through said arms 24 and 25 and is held therein by a cotter pin 28. A lug 29, or equivalent, prevents rotation of the bolt 27.

A relatively long arm 30 is secured to the lower end of the casing 5 by cap screws 31 and dowel pins 32. At the lower end of the arm 30, an out-turned end 33 is perforated with a clearance hole through which the threaded bolt 27 passes. The out-turned end 33 is concave on each side to receive the convex nuts 34 and 35 which are threaded on the bolt 27. By loosening the nuts 34 and 35 and by rotating either one to move the arm 30, to the left or to the right, the inclination of the casing 5 may be varied in very small increments of movements, after which the other nut may be rotated to lock the arm 30 in its adjusted position.

When the casing 5 is mounted on its support, as described, it may be rotated by rotating the sleeves 17 and 19 about the pipe 26, and when an approximate position has been found, the set screws 18 are tightened against the pipe 26. The means for changing the rotatable position of the casing 5 in finer gradations will now be explained.

Two parallel arms 36 and 37 project radially from the sleeve 17, which is now clamped to the pipe 26 by the set screws 18. A pair of wider spaced arms 38 and 39 project laterally from the sleeve 19. A cotter pin 41 passes through the outer end of the bolt 40 and prevents its withdrawal. A nut 42 is threaded on the bolt 40 and has a tail 43 which slides in the gap between the arms 36 and 37 when the bolt 40 is rotated.

A set screw 44 passes through a lug 45 projecting from sleeve 19, and carries on its inner end a shoe 46 which bears against sleeve 17, when the set screw is turned inwardly, to clamp the sleeves 17 and 19 firmly together.

To rotate the casing about the sleeve 17, in micrometric progression for exact positioning of the casing 5, the set screw 44 is backed out slightly so that the sleeve 19 is free to move about the axis of the sleeve 17. The bolt 40 is now rotated to move the nut 42 axially thereof, this operation will rotate the sleeve 19 and casing 5 about the axis of the supporting pipe 26. When the desired position for the casing 5 has been found, the set screw 44 may be turned in to clamp sleeves 17 and 19 together and nut 47 may then be tightened.

These adjustments may be made at the time of installation and unless the field of illumination is shifted due to effect of frost upon the support, they need to never be made again unless unexpected exigencies may arise from conditions or ordinary use make such adjustments necessary.

While I have mentioned the support as tubular in the claims, it may as well be solid. The word tubular is used only as means of definition.

I am aware that many changes may be made and numerous details of construction may be varied through a wide range without departing from the principles of this invention, and I therefore do not purpose limiting the patent granted hereon, otherwise than necessitated by the prior art.

I claim as my invention:

1. In a light signal device, a support therefor, a sleeve rotatable on the support having a pair of spaced arms projecting radially therefrom, a second sleeve rotatably mounted on the first sleeve having a pair of radially projecting lugs with confronting loose bores and a threaded bolt extending through the bores and a tailed nut in threaded engagement on the bolt, said lugs encompassing the said arms of the first sleeve and the tail of said nut positioned intermediate and adapted to movably engage said arms, and screw means to lock the first sleeve in position on its support.

2. In a light signal device, a support therefor, a sleeve rotatable on the support, a second sleeve rotatable on the first sleeve, a casing inclinably mounted on the second sleeve, an arm depending from the casing having an outturned end with concaved sides and a clearance hole therethrough, a pair of spaced arms radially projecting from said second sleeve encompassing said outturned end of the depending arm having confronting bores, and one of said arms having an offset portion, a bolt extending through the bores of the spaced arms and through the bore in the outturned end of the depending arm having its head abutting the offset portion on one of the spaced arms to prevent turning of the bolt, and convex faced nuts in threaded engagement on the bolt and engaging said outturned end to micrometrically position it along said bolt.

3. In a light signal device, a tubular support therefor, a sleeve rotatable on the support having a pair of spaced arms projecting radially from the sleeve, a second sleeve rotatably mounted on the first sleeve having a pair of radially projecting lugs with transverse loose confronting bores and a threaded bolt extending through the bores and a tailed nut in threaded engagement on the bolt, said lugs encompassing the said arms of the first sleeve and the tail of said nut positioned intermediate and adapted to movably engage said arms, a pair of spaced arms radially projecting from said second sleeve having confronting bores and one of said arms having an offset portion to abut a threaded bolt extending through the bores to prevent turning of the bolt, a casing inclinably mounted on the second sleeve and an arm depending from the casing having an outturned end with concaved sides and a clearance hole therethrough, said depending arm having its outturned end positioned intermediate said arms on the second sleeve and held in adjustable engagement therewith by convexed faced nuts on the aforesaid bolt passing through the clearance hole in the outturned end.

In testimony whereof I have hereunto subscribed my name.

DANIEL J. McCARTHY.